United States Patent
Ghuge et al.

(10) Patent No.: US 11,252,247 B1
(45) Date of Patent: Feb. 15, 2022

(54) DYNAMIC STREAMING CONTENT BUFFERING BASED ON USER INTEREST

(71) Applicant: INTERNATIONAL BUSINESS MACHINES CORPORATION, Armonk, NY (US)

(72) Inventors: Deepak R. Ghuge, Sangamner (IN); Sasikanth Eda, Vijayawada (IN); Sandeep Ramesh Patil, Pune (IN); Manojkiran Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/328,009

(22) Filed: May 24, 2021

(51) Int. Cl.
*G06F 13/00* (2006.01)
*H04L 29/08* (2006.01)

(52) U.S. Cl.
CPC ...... *H04L 67/2804* (2013.01); *H04L 67/2842* (2013.01)

(58) Field of Classification Search
CPC .. H04L 67/2804; H04L 67/2842; H04L 67/28
USPC ....... 709/231, 232, 217–219, 246, 230, 212, 709/213
See application file for complete search history.

(56) References Cited

U.S. PATENT DOCUMENTS

| | | | |
|---|---|---|---|
| 8,223,975 B2 * | 7/2012 | Marko | H04H 20/40 381/2 |
| 8,971,541 B2 * | 3/2015 | Marko | H04H 40/90 381/2 |
| 9,008,812 B2 * | 4/2015 | Michalski | G06F 3/04847 700/94 |
| 9,166,712 B2 * | 10/2015 | Marko | H04N 21/4756 |
| 9,479,273 B2 * | 10/2016 | Marko | H04H 60/91 |
| 9,942,610 B2 * | 4/2018 | Chimayan | H04N 21/8456 |
| 10,540,057 B2 * | 1/2020 | Michalski | H04B 7/1851 |
| 2009/0320075 A1 * | 12/2009 | Marko | H04H 20/40 725/56 |
| 2012/0263305 A1 * | 10/2012 | Marko | H04H 20/28 381/2 |
| 2013/0003993 A1 * | 1/2013 | Michalski | G06F 3/0482 381/119 |
| 2013/0287212 A1 * | 10/2013 | Marko | H04H 20/74 381/2 |

(Continued)

FOREIGN PATENT DOCUMENTS

EP 3462745 A1 4/2019
WO 2020227781 A1 11/2020

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Kenneth R Coulter
(74) *Attorney, Agent, or Firm* — Jordan T. Schiller

(57) ABSTRACT

A method, computer system, and a computer program product for interest-based digital content caching is provided. Hints regarding content of interest associated with a user are determined and used to identify portions of streaming media that are uninteresting to the user. Then the streaming media is played for the user and a portion of the post-uninteresting content is stored in a child cache before the portion of uninterest is played.

17 Claims, 7 Drawing Sheets

(56) References Cited

U.S. PATENT DOCUMENTS

| | | | |
|---|---|---|---|
| 2015/0171979 A1* | 6/2015 | Marko | H04H 20/74 381/2 |
| 2015/0220223 A1* | 8/2015 | Michalski | G06F 3/04842 715/716 |
| 2017/0366859 A1 | 12/2017 | Chimayan | |
| 2020/0145701 A1 | 5/2020 | Liu | |
| 2020/0393939 A1* | 12/2020 | Michalski | H04B 7/1851 |

* cited by examiner

US 11,252,247 B1

DYNAMIC STREAMING CONTENT BUFFERING BASED ON USER INTEREST

BACKGROUND

The present invention relates generally to the field of computing, and more particularly to digital content streaming.

Video and other digital content streaming continues to grow rapidly worldwide as consumer demand increases for digital content. Increasing network speeds together with proliferation of mobile devices able to receive and present digital content to consumers in nearly any location continue to fuel this demand. Digital content streaming has now become a staple for most people.

SUMMARY

According to one exemplary embodiment, a method for interest-based digital content caching is provided. Hints regarding content of interest associated with a user are determined and used to identify portions of streaming media that are uninteresting to the user. Then the streaming media is played for the user and a portion of the post-uninteresting content is stored in a child cache before the portion of uninterest is played.

A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
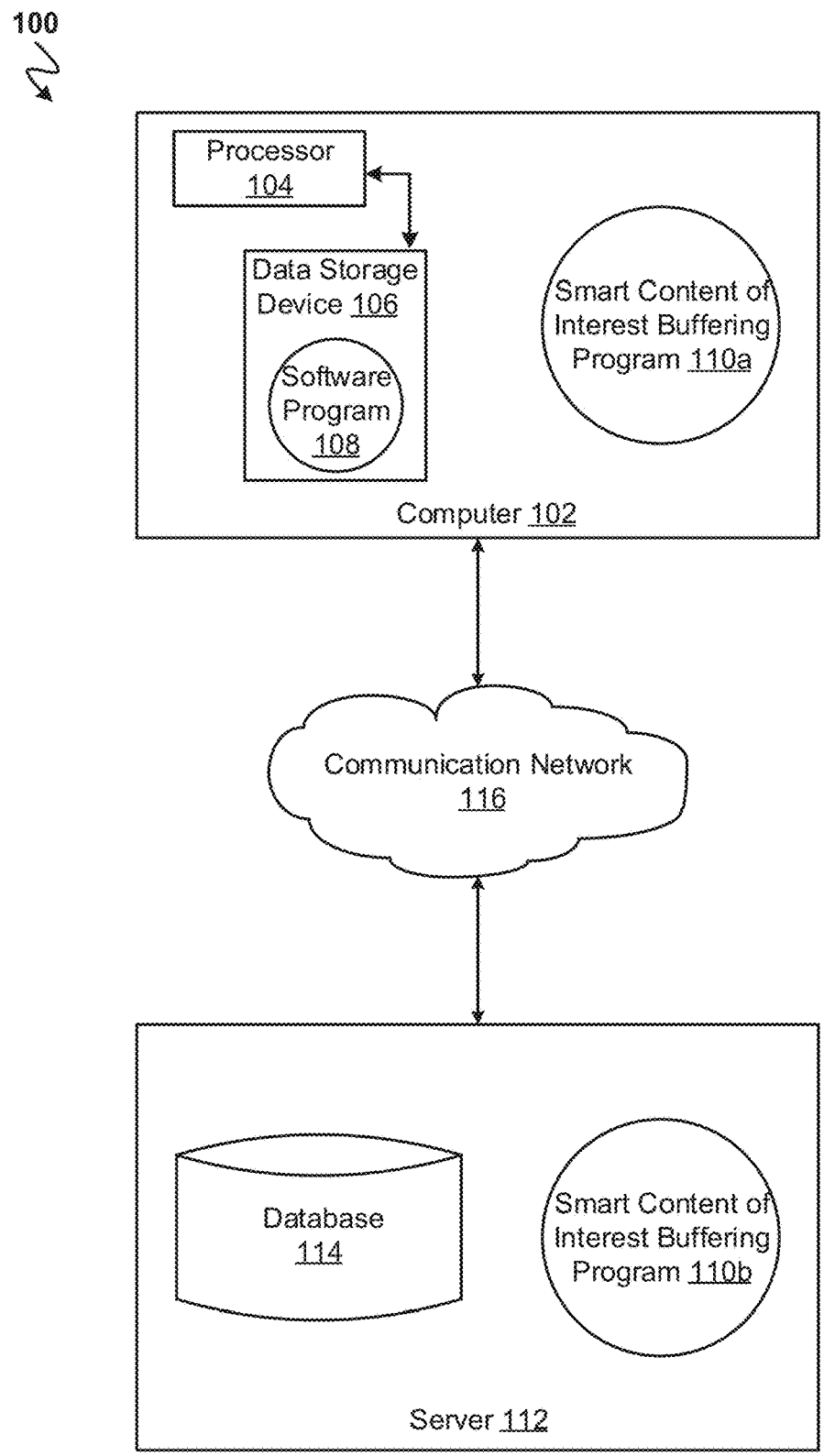
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As described above, video and other digital content streaming continues to grow rapidly worldwide as consumer demand increases for digital content. Increasing network speeds together with proliferation of mobile devices able to receive and present digital content to consumers in nearly any location continue to fuel this demand. Digital content streaming has now become a staple for most people. Digital content (i.e., digital media) may take a variety of forms including audio (e.g., music), video, multimedia, and the like. Due to these increased demands, systems and networks involved in streaming become increasingly taxed. Maintaining and cultivating positive consumer satisfaction with the streaming experience is important in this competitive and lucrative segment. Consumers will negatively react to disruptions while streaming content since a quality experience is expected. In order to provide a more consistent quality of streaming service to a consumer, streaming content data is prefetched and stored in buffer cache which can mitigate the impact of transient network disruptions. However, determining an efficient buffer size that can mitigate disruptions while minimizing computer resource usage (e.g., storage allocated for a buffer) is a difficult task.

As such, it would be advantageous to, among other things, provide more intelligent data caching for streaming content that maintains a high quality user experience while efficiently using computer resources. More advantageously, interests of a specific user may be analyzed and used to identify portions of streaming content that the user is interested in, or uninterested in, in order to cache streaming content strategically.

The following described exemplary embodiments provide a system, method and program product for dynamic streaming content buffering based on user interest. As such, the present embodiment has the capacity to improve the technical field of digital content streaming by using child threads to cache interesting content portions in advance of uninteresting portions in order to provide immediate and lag-free serving of streaming content data in the event a user skips over uninteresting portions of content. More specifically, a framework is provided to help optimize cloud resources (e.g., compute, network) used by digital content streaming platforms, including hosting and client devices, by dynamically adjusting the rate of transfer for content portions (e.g., frames of video) based on user interests. User interests may be collected based on, for example, user work profiles, video watching behavior, social interests and the like. The dynamic adjustments may be implemented though storage manipulation (e.g., hard disks) and process-level interactions by reducing sharable buffer cache queue depth, forking and synchronizing child threads to read data from disks according to frame transfer rates in order to optimally use the network buffer provided by the streaming player thereby improving the user client experience.

In embodiments the framework identifies the maximum client network buffer size and the current setting of the client network buffer size as configured by a streaming player application executing on a user device. The framework makes these identifications based on collecting user device and streaming player application configurations, for example, during an initial authentication exchange. The collected parameters may be stored at the streaming platform cloud and may further be adjusted at run-time.

As such, client network buffer capacity may dynamically increase or decrease based on, for example, customer adopted resolution and quality, network speed, and peer application needs. For instance, the client network buffer capacity of the streaming player application may be increased if other applications are not using the client system provided buffers or the user has set the quality of the streaming content playback to high resolution. In some embodiments, increased resources (e.g., compute, network) to allow for higher quality content playback may depend on the user having increased privileges, such as a premium user who may have paid for an enhanced streaming experience with a streaming service. On the other hand, buffer capacity may be dynamically reduced if other applications need access to the buffer capacity or the user sets the playback quality lower.

In embodiments, the framework may identify portions of the streaming content that are of interest or uninterest to the user on, for example, a per-device basis. Hints identifying portions of interest or uninterest may be derived from analysis of user work profiles, video watching behavior, social interests, and so on. Thereafter, once digital content is selected for streaming to the user device, the digital content may be analyzed to identify portions (e.g., video frames) of the content that may be of interest or uninterest to the user. The analysis may be done using a variety of processing techniques, such as image-to-text matching, automatic speech recognition, optical character recognition (OCR), image mapping, and the like.

If portions of the streaming content are identified which are of interest or uninterest, the timings and duration of the portions are collected and an instruction set may be built dynamically using this timing and duration data and passed to the dedicated process which is responsible for serving or presenting the content to the user. Based on the timing and duration of uninteresting portions, the instruction set built to the dedicated process may spin up separate child threads before the uninteresting portions of the content renders or is presented to the user. The amount of time in advance of the uninteresting portions that the child threads are spun up may depend on factors such as disk speed and current streaming network workload.

In embodiments, a buffer cache queue may be created per spined child thread, with a dynamically set length based on the duration of the uninteresting portion. Moreover, the framework also may control the buffer cache queue allocated for the dedicated process. According to some embodiments, the child buffers and main buffer are synchronized by dynamically reducing the buffer cache queue size (e.g., a slow reduction stopping when a predefined minimum queue length is reached) before the start of the uninteresting portion. Once this dynamic reduction of the buffer begins, a child thread may be assigned responsibility to read data blocks with a time offset (e.g., where the offset equals the blocks of streaming content data that are anticipated may be skipped from the end of the uninteresting portion) and the child buffer cache queue size may be dynamically increased.

If the user jumps or skips forward (e.g., skips a scene in video content) past the uninteresting portion as expected based on the prior analysis of the content, since the uninteresting blocks of content data are available in the buffer cache queue, the write operations will go to the disk. Thereafter, the framework identifies the process dedicated buffer cache miss and verifies if this was due to a user-initiated skip. If the framework verifies the user did initiate the skip, then the child buffer cache queue is synchronized and pushed to the streaming content player. In this manner, disk, network, and cache resources are not wasted since the next interesting portions of content are already available in the cache and the user experience is maintained since the user may not experience lag or other issues after skipping ahead in the streaming content.

However, if the user does not skip past the uninteresting portions of the content, the data blocks continue to be served from the minimum (i.e., decreased) buffer queue and once the blocks from the minimum buffer queue are served, the queue may be dynamically increased and the user may not encounter any lag due to the continuity in the stream as reading sequential data from the disk is faster. Once a predefined milestone within the uninteresting portion is reached (e.g., the user is at the mid-point of the uninteresting portion of a video), the child thread may be terminated and the child buffer cache synchronized (e.g., integrated with or appended) to the main process cache queue. In some embodiments, the framework may preserve certain interesting portions of content in cache and expires such preserved portions slowly as time progresses in order to provide lag-free replay if the user decides to rewind or skip back to replay interesting portions.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a smart content of interest buffering program 110a. The networked computer environment 100 may also include a server 112 that is enabled to run a smart content of interest buffering program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114.

According to various implementations of the present embodiment, the smart content of interest buffering program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the smart content of interest buffering program 110a, 110b (respectively) to dynamically and intelligently buffer streaming content to improve the quality of a user's experience. The smart content of interest buffering method is explained in more detail below with respect to FIGS. 2-4.

Figure 2:
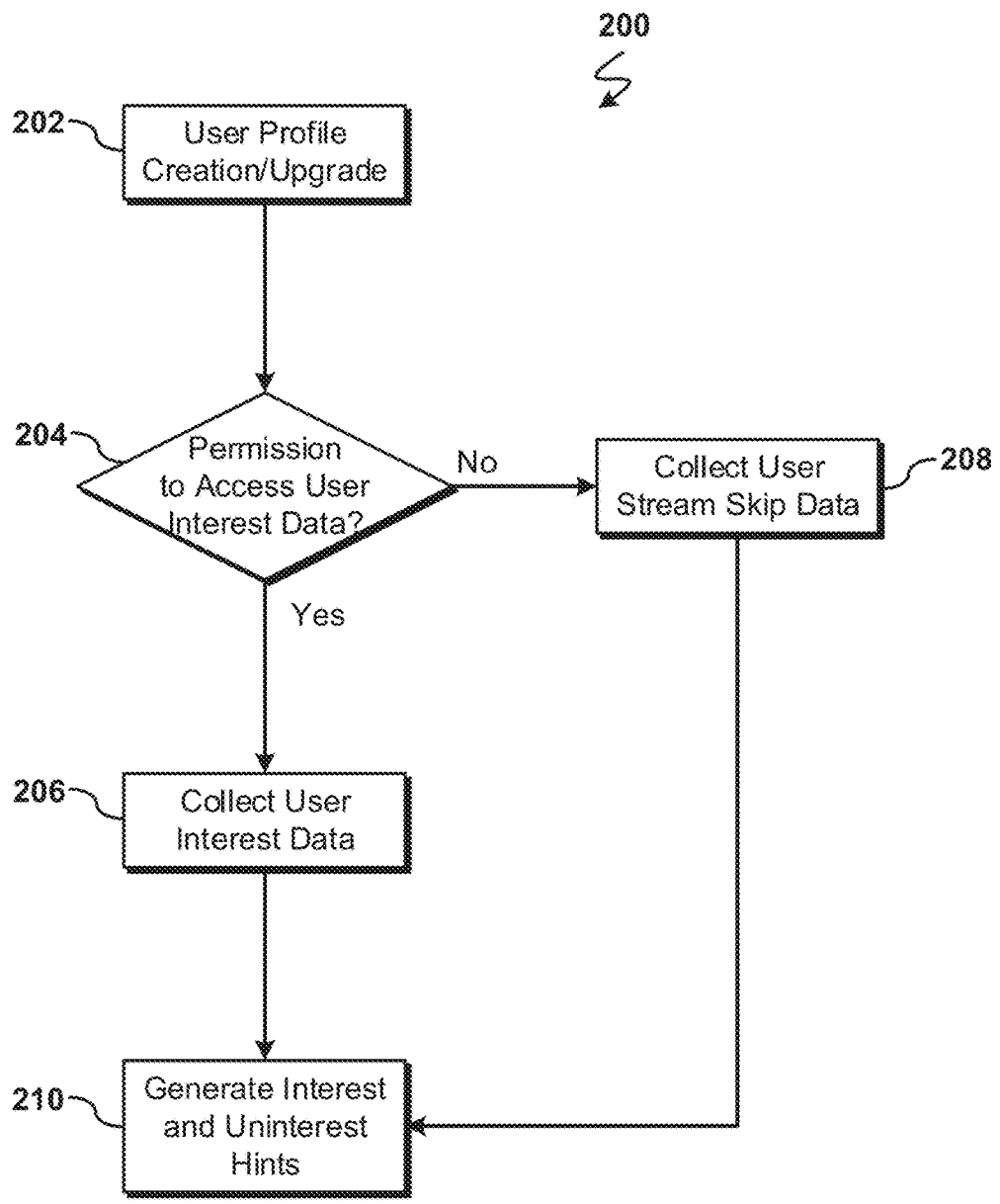
FIG. 2 is an operational flowchart illustrating a process for interest hint generation according to at least one embodiment.

Referring now to FIG. 2, an operational flowchart illustrating the exemplary interest hint generation process 200 used by the smart content of interest buffering program 110a and 110b according to at least one embodiment is depicted.

At 202, a user profile is created, or in some embodiments, an existing user profile is upgraded. According to at least one embodiment, the streaming service (e.g., movie streaming service or music streaming service) may prompt a user to create a user profile. The user profile may, for example, contain various preferences for customizing notifications and user interface. Additionally, the user profile may be used to store user interest data. The user profile may be stored in data storage, such as a database 114. In some implementations, a streaming service may have multiple tiers of users (e.g., basic user and premium user) and only use user interest data in conjunction with a higher tier membership. In these implementations, user interest data may not be stored until the user upgrades to a higher tier.

For example, user Joe may upgrade a user account with video streaming service S to a premium tier. As a part of the premium tier, S incorporates the smart content of interest buffering program 110a and 110b and collects user interest data to give the user an enhanced experience.

Then, at 204, interest hint generation process 200 determines if permission is granted to access user interest data. In embodiments, user interest data may be collected after expressly obtaining user permission or consent. For example, a dialog box or other user interface (UI) feature may be generated and presented to the user via a screen connected to the user's device (e.g., computer 102) requesting approval to collect user interest data in order to enhance the user's experience and display a button to accept and a button to reject the request. The user may then indicate their decision via pressing the appropriate button (i.e., to accept or reject). The user's decision may be saved in the user profile and the user may later change their decision by accessing their user profile (e.g., checking or unchecking a box corresponding to the user's consent to access and use user interest data).

Continuing the prior example, after upgrading his account, Joe is asked for consent to collect user interest data via a dialog box which indicates that if Joe agrees, Joe will be asked to provide links to profiles about Joe and Joe may further be asked questions to ascertain Joe's interests. Additionally, the dialog box notes that this data will only be used to enhance Joe's streaming experience and provide a button to accept or a button to reject the request to obtain interest data from Joe. Thereafter, Joe reads the displayed dialog box and clicks on the accept button to indicate that Joe consents to have data regarding his interests collected and his consent is subsequently saved.

If the interest hint generation process 200 determined that the user gave permission to access user interest data at 204, then user interest data is collected at 206. According to at least one embodiment, a UI may be presented to the user with elements (e.g., text boxes) designated for the user to enter information related to the user's interests. In some implementations the UI displayed gives the user the option to provide links to work profiles, social media profiles, and so on. Thereafter, the interest hint generation process 200 may communicate (e.g., via network 116) with the corresponding profile platform (e.g., work or social media) to retrieve relevant data indicating user interests. For example, a job title, job responsibilities, hobbies, events attended, and so forth may be retrieved from the user-linked profiles for analysis. Additionally, in some embodiments, the user's postings on user-linked platforms may be analyzed to determine user interests (e.g., a user may post a positive or negative reaction after watching a particular movie).

In some embodiments, the user may also be asked to answer predefined questions to collect user interest data. For example, questions may ask the user what type of movies the user likes or avoids, as well as list some of the user's favorite movies.

Continuing the previous example, Joe is presented with a UI which allows Joe to enter links to a work profile and a social media profile as well answers some questions about Joe's interests. Thereafter, the interest hint generation process 200 follows the links to Joe's work profile and social media profile to collect data such as Joe's job title, employer, hobbies, and so forth.

However, if the interest hint generation process 200 determines that the user has not given permission to access user interest data at 204, then data indicating streaming content the user has skipped in the past is collected at 208. According to at least one embodiment, the interest hint generation process 200 may communicate with the streaming player software, access a database 114 of user behavior with respect to previous streaming content to obtain historical data indicating the types of streaming content portions (e.g., scenes in video) the user has skipped over in the past. In embodiments, user consent to collect historical skip data may be obtained first. Additionally, the category of content the user most often selects to stream or avoids may be collected and analyzed as well (e.g., the user typically selects action movies to watch).

If user interest data was collected at 206 or if data indicating streaming content the user has skipped in the past is collected at 208, then hints indicating user interest or uninterest is generated at 210. According to some embodiments, if the user provided user interest data, this data may be analyzed to generate hints regarding the user's interests. For example, if the user linked to a work profile, the user's job title and responsibilities may be analyzed to determine the user's interests in the context of their profession. For instance, if the user is a manager, a hint may be generated that indicates the user would be interested in content that depicts leadership skills and conflict resolution. Social media data may also be analyzed to identify posts the user liked or the content of posts the user made. For example, the user may consistently like posts regarding action movies and the user may write posts with favorable reviews of action movies. Therefore, a hint may be generated that indicates the user is interested in action sequences.

If the user did not give permission to access user interest data, the data regarding the streaming content the user skipped that was collected at 208 may be analyzed to generate hints about the user's interests and uninterests. Based on the skip data collected, the portions of streaming data the user skipped may be classified (e.g., a scene depicting drama) to determine the frequency with which the user skips certain types of streaming content and compare this frequency, for instance, with a predefined threshold to determine that the user is not interested in a type of content. In alternative embodiments, the interest hint generation process 200 may collect and analyze data regarding the streaming content the user skipped in addition to the collected user interest data, provided the user consents, to generate interest hints and uninterest hints.

For example, if, instead, Joe had not consented to access interest data and did consent to analysis of his past content viewing, the interest hint generation process 200 may analyze movies that Joe streamed to determine that Joe skips scenes in videos that are categorized as comedy 50% of the time which exceeds the predefined threshold of 25%. Therefore, a hint is generated that indicates that Joe is uninterested in comedy scenes.

Figure 3:
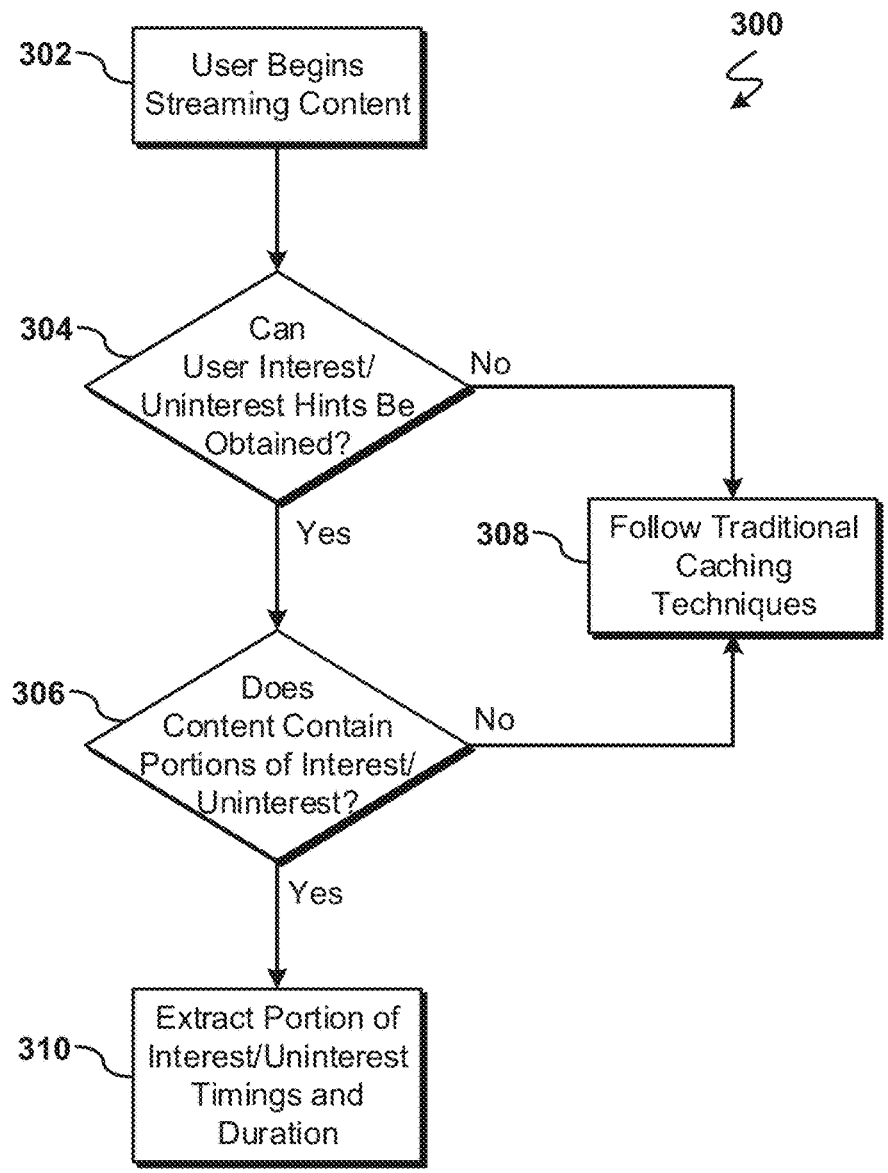
FIG. 3 is an operational flowchart illustrating a process for identifying content of interest according to at least one embodiment.

Referring now to FIG. 3, an operational flowchart illustrating the exemplary content of interest identification process 300 used by the smart content of interest buffering program 110a and 110b according to at least one embodiment is depicted.

At 302 the user begins streaming content (i.e., digital media). In embodiments, the user may use streaming content player software (e.g., software program 108) deployed by the streaming service to play back streaming content. To begin streaming content, the user may select content to stream and, according to some embodiments, additionally interact with a UI feature (e.g., a play button) to begin streaming content in implementations when the content does not begin playing automatically. Thereafter, the streaming service may retrieve blocks of stream content data which the player renders or otherwise presents to the user.

For example, Joe uses a video streaming service to watch movies. The streaming service uses video player software VP to play streaming video. VP has a UI that displays a list of available movies and allows the user to select a movie to play. Joe finds the movie Action Archaeologist in the list of available movies and selects the movie by clicking on the movie title. Thereafter, Joe presses the play button in the UI of VP and the streaming service then begins retrieving blocks of data corresponding with Action Archaeologist for caching and playback. As streaming content is retrieved, the movie begins playing for Joe in VP.

Next, at 304, the content of interest identification process 300 determines if user interest hints (and uninterest hints) can be obtained. As described above with respect to FIG. 2, interest hint generation process 200 may generate hints regarding the content of interest and uninterest for a user. If the interest hint generation process 200 generated hints corresponding with the user, the hints may be stored in a data storage structure, such as a user interest hint database (e.g., database 114). As such, the content of interest identification process 300 may determine if user interest hints exist and may be obtained by searching the user interest hint database or other designated storage to find if interest hints corresponding with the user exist.

For example, and as described in the prior example with respect to FIG. 2, Joe completed his user profile and provided a variety of data from which user interest hints were generated. These hints were stored in a user interest hint database. The interest identification process 300 searches the user interest hints database for "Joe" and retrieves interest hint data from the database corresponding with Joe.

If the content of interest identification process 300 determines that user interest hints can be obtained at 304, then the content of interest identification process 300 determines if the streaming content contains portions of interest or uninterest to the user at 306. In embodiments, the content the user began streaming at 302 was analyzed previously to determine distinct portions (e.g., scenes in video) of the content. For instance, video frames may be analyzed using image analysis that may determine differences (e.g., colors, voices, music) in consecutive frames exceed a threshold, thus indicating a new scene. This process may continue until the streaming media content (e.g., movie) has been completely divided into a set of portions. These constituent portions may then be analyzed and classified. Content analysis may use a combination of techniques, such as image-to-text matching, automatic speech recognition, optical character recognition (OCR), image mapping, and the like. After the content has been analyzed, textual or other representations of the content may be generated. These representations may be input into a classification machine learning model, (e.g., a supervised machine learning model) that classifies the content into relevant categories (e.g., action scene, comedy scene). The portion classification data corresponding with streaming content may be stored after analysis in a database 114 or other storage.

The content of interest identification process 300 may retrieve the content portion classification data corresponding with the user-selected streaming content and compare the classification data to the user hints data retrieved previously at 304. In embodiments, if any of the content portion classification data matches a user interest or uninterest hint, the content of interest identification process 300 may determine that the content does contain portions of interest or uninterest. Alternatively, if none of the content portion classification data matches a user interest or uninterest hint, the content of interest identification process 300 may determine that the content does not contain portions of interest or uninterest.

Continuing the above example, the Action Archaeologist movie selected by Joe already was previously analyzed and each distinct scene was classified. Scenes of the movie were classified as action, comedy, romance, and drama. Based on Joe's hint data, Joe has interest in action scenes and is uninterested in comedy scenes. As such, the content of interest identification process 300 determines that the streaming content contains portions of interest or uninterest to the user.

However, if the content of interest identification process 300 determines that user interest hints can not be obtained at 304 or if the content of interest identification process 300 determines that the streaming content does not contain portions of interest or uninterest to the user at 306, then the content of interest identification process 300 determines that traditional caching techniques will be used at 308. In embodiments, if the content of interest identification process 300 determines cannot obtain user interest hints or find any matches to content portions, the content of interest identification process 300 cannot use intelligent caching based on reasonable predictions about user behavior while streaming content and therefore the default traditional sequential caching techniques are used instead.

If the content of interest identification process 300 determines that the streaming content contains portions of interest or uninterest to the user at 306, then the timings and duration of the portions of interest and uninterest are extracted at 310. As described above at 306, the streaming content, when analyzed, is broken down into constituent portions for classification. As part of this process, the portions may be delineated by the timing and duration of each portion. For example, portion 1 of a video may be defined as starting at time 0 and have a duration of 5 minutes. As such, portion 1 spans from minute 0 to minute 5 of the video. Portion 2 may be defined as beginning at minute 6 and lasting for 4 minutes. Thus, portion 2 spans from minute 6 to minute 10. In embodiments, the content portions may continue to be defined as such until all of the streaming content corresponds with a defined portion. This timing and duration data may, for example, be stored together with the classification data in a database 114 or in a separate database 114 depending on implementation.

The timing and duration data corresponding with the portions previously determined to match interest or uninterest of the user may then be retrieved from the appropriate data storage (e.g., database 114). The content portion timing and duration data may be stored along with a flag or other marker indicating if the portion matches an interest or uninterest of the user.

Continuing the prior example, the timings and durations of the portions of the Action Archaeologist movie corresponding with action scenes and comedy scenes are retrieved from the database 114. More specifically, portion 1 which is classified as action, starts at minute 0 and has a 5 minute duration, portion 5 which is classified as comedy begins at minute 12 and has a 3 minute duration, and portion 6 which is classified as action begins at minute 15 and has a 4 minute duration. Joe's hints indicate interest in action scenes and uninterest in comedy scenes. Therefore, the timing a duration of portions 1 and 6 will be saved along with an indication that Joe is interested in those scenes. Likewise, the timing and duration of portion 5 will be saved with an indication that Joe is probably uninterested in that scene.

Figure 4:
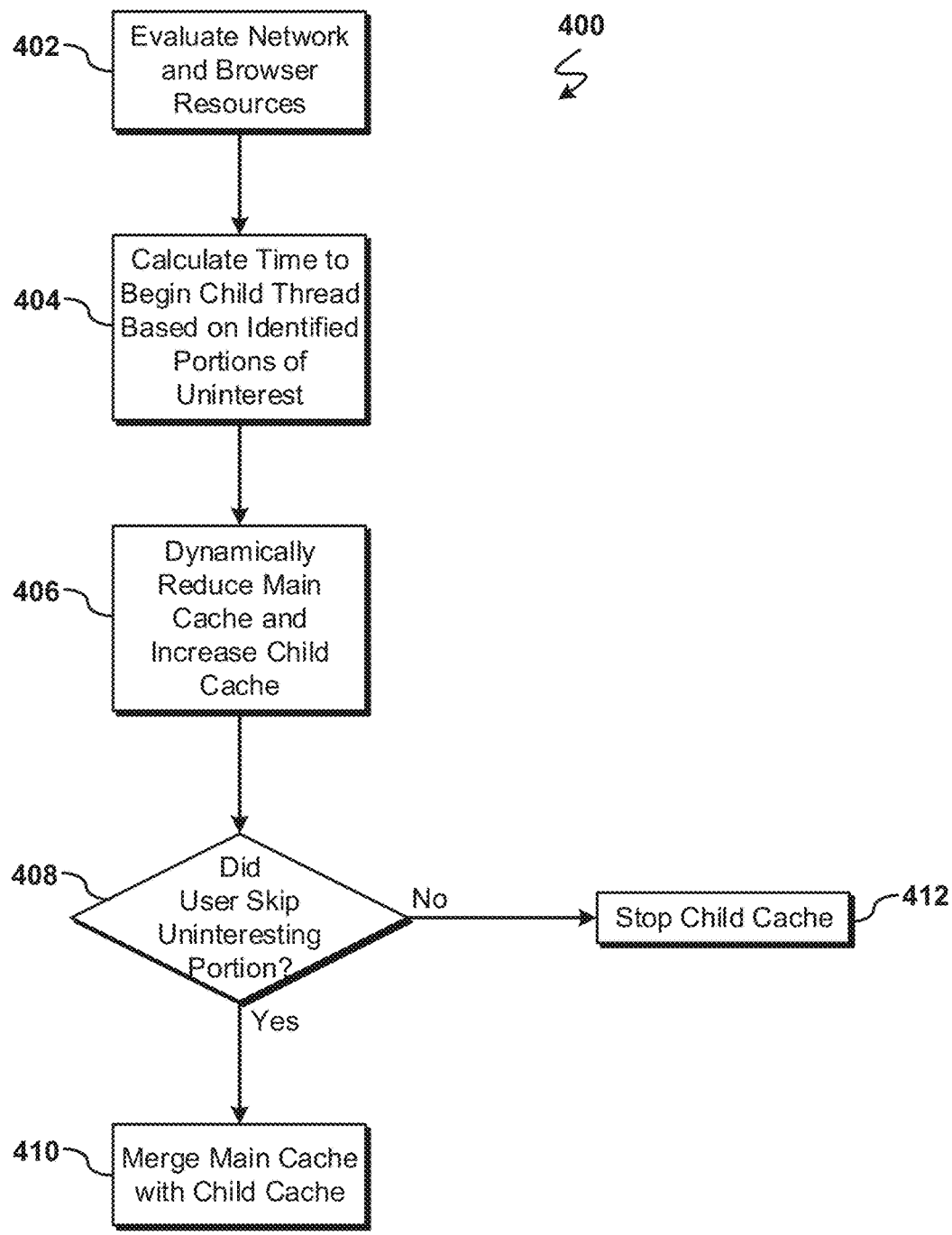
FIG. 4 is an operational flowchart illustrating a process for dynamic interest-based content buffering according to at least one embodiment.

Referring now to FIG. 4, an operational flowchart illustrating the exemplary dynamic interest-based content buffering process 400 used by the smart content of interest buffering program 110a and 110b according to at least one embodiment is depicted.

At 402, network and browser resources are evaluated. In embodiments, the capabilities and resources of the network (e.g., communication network 116) and the electronic device being used to display streaming content are collected. For instance, the dynamic interest-based content buffering process 400 may query the operating system of the electronic user device (e.g., computer 102) to determine the current connection speed, storage resources available, memory speed, memory capabilities, maximum display resolution, and so forth. In other embodiments, the dynamic interest-based content buffering process 400 may perform benchmarks or other testing to determine the resources and capabilities available.

For example, Joe may be streaming the Action Archaeologist movie on his laptop. As such, the dynamic interest-based content buffering process 400 queries the operating system on Joe's laptop to determine that Joe's download speed is 25 megabits per second, Joe's laptop has 4 gigabytes of random access memory available, and uses a 1080p display.

Next, at 404, the time to begin a child thread is calculated based on the identified portions of uninterest. In embodiments, the time to spin up or begin a child thread to build and fill a secondary child buffer queue is calculated based on the portions of uninterest in the content the user has selected to stream or is streaming. The portions of uninterest together with timings and durations corresponding with the portions of uninterest were identified as discussed previously with respect to FIG. 3. This timing and duration data may be retrieved and used in conjunction with the network and browser resource data collected and evaluated as described above at 402 to calculate the appropriate start time for a child thread. The child thread may then build a buffer of content data occurring after the uninteresting portion ends. The time to start a child thread is calculated to mitigate any lag or other loss of user experience that may occur if the user skips the uninteresting portion of the content and continues consuming the streaming content after the portion of uninterest. To that end, the start time of the uninteresting portion may indicate when the user will skip forward in the streaming content. The time at which the uninteresting content ends may therefore indicate when the user will want to resume playback and also marks the beginning of where content (i.e., post-uninteresting content) should be cached to ensure a quality user experience. Therefore, a time offset may calculated for when in the streaming content a child thread should begin caching. For example, if the post-uninteresting content begins 10 minutes and 30 seconds from the current point of the content being played for the user, the offset that the child thread will begin caching is the current time position in the content plus 10 minutes and 30 seconds. As such, the child thread will begin caching at this offset time and sequentially add data blocks from that point forward.

Additionally, the resources available and the capabilities of those resources are considered in determining when to begin the child thread. The combination of slow memory speeds and slow network bandwidth may require a child thread begin well in advance of the start of an uninteresting portion in order to have enough time to adequately cache enough streaming content after the uninteresting portion to maintain a quality user experience in the event the user skips the uninteresting portion. On the other hand, if the available resources provide fast performance, then the child thread may be spun up closer to the start of the uninteresting portion.

In embodiments, a minimum cached amount of content may be determined to ensure that with the user's current resource capabilities, lag or other negative user experiences may be avoided. Continuing the prior example, based on the Joe's current resource capabilities, the dynamic interest-based content buffering process 400 determines that a minimum of 30 seconds of cached content is needed to maintain satisfactory quality of service. It may be appreciated that other metrics besides time may be used to determine the minimum amount of cache needed to maintain a minimum quality of service such as a minimum data size (e.g., 10 megabytes).

Once a minimum cache size is determined, then, the amount of time needed to fill the child tread cache to the minimum size before the start of the uninteresting portion may be determined. For example, to build a 30 second cache before the start of the next uninteresting portion, the dynamic interest-based content buffering process 400 will need at least 15 seconds to cache 30 seconds of data, therefore the time $T_1$ of the start of the next uninteresting portion minus 15 seconds (i.e., $T_1$-15 seconds) equals the time $T_2$ that the child thread should be spun up and begin caching the streaming content that begins at the end of the uninteresting portion.

Continuing the prior example, the dynamic interest-based content buffering process 400 received data indicating that the next uninteresting portion of the Action Archaeologist movie is portion 5 which begins at minute 12. Thus, $T_1$ is 12 minutes into the Action Archaeologist movie. The dynamic interest-based content buffering process 400 determined that 15 seconds would be required to build the minimum 30 seconds of buffered content required to maintain an adequate quality of service. Thus, the dynamic interest-based content buffering process 400 will determine that a child thread should be started at $T_1$-15 seconds or 11 minutes and 45 seconds into the Action Archaeologist movie. Since uninteresting portion 5 is 3 minutes in length, the child thread will request sequential data blocks from the Action Archaeologist movie beginning from the end of portion 5, or minute 15 ($T_1$ is minute 12 plus 3 minutes duration equals minute 15) onwards and placing those data blocks into a child cache.

Then, at 406, the main streaming content cache is dynamically reduced while the child cache is dynamically increased. According to at least one embodiment, after the child thread is started at the calculated time as described above at 404, the main cache may be reduced in size (e.g., as blocks of data are served to the player and consumed by the user, new blocks may not be requested and stored in the main cache thereby shrinking the size of the cache). In embodiments, concurrently with the reduction in the main cache size, the child thread may increase the child cache size by the same amount the main cache is decreasing to maintain a constant combined cache size. In other embodiments, overall cache size may not need to be maintained, thus the decrease of the main cache may not be needed or, alternatively, the increase in the child cache size may not match the decrease in the main cache size (e.g., the child cache may be able to temporarily increase at a greater rate and a greater amount than the main cache is shrinking).

Continuing the prior example, Joe's main cache size is 50 megabytes. Once the child thread is started at 11 minutes and 45 seconds into the Action Archaeologist movie, the child cache begins to store data blocks corresponding with streaming content starting at minute 15 of the Action Archaeologist movie. At 11 minutes and 50 seconds, i.e., 5 seconds later, the main cache is 45 megabytes and the child cache contains 5 megabytes of offset streaming content data. At 11 minutes and 55 seconds, i.e., another 5 seconds later, the main cache has shrunk to 40 megabytes and the child cache has increased to 10 megabytes of data. Finally, another 5 seconds later, at 12 minutes into the Action Archaeologist movie, right when the uninteresting portion is beginning, the main cache is now 35 megabytes and the child cache is 15 megabytes, thus the overall combined cache size has remained a constant 50 megabytes, however, streaming content beyond the uninteresting portion has now been cached in sufficient quantity (i.e., above the previously determined 30 seconds of streaming content) to provide seamless and uninterrupted quality of service should Joe skip the uninteresting portion.

At 408, the dynamic interest-based content buffering process 400 determines if the user skips the uninteresting portion. In embodiments, the dynamic interest-based content buffering process 400 may determine the user skipped a portion of the streaming content by communicating with the player software, for example, via an application programming interface (API) by being notified in response to the user interacting with certain UI elements such as a seek bar or a fast forward button. In other embodiments, the dynamic interest-based content buffering process 400 may determine the user skipped forward in response to a cache miss when reading from the main buffer cache, indicating that a portion of the content not in the main cache is being requested. Thereafter, the dynamic interest-based content buffering process 400 may verify that the user skipped forward by, for example, querying the streaming player software to determine the skipping was in response to the user moving the seek bar, or the like.

Continuing the previous example, Joe reaches the uninteresting comedy scene in the Action Archaeologist movie at minute 12 and then uses the seek bar under the video displayed within the streaming video player to advance the movie until the scene ends at minute 15. In response to Joe dragging the seek bar forward, the dynamic interest-based content buffering process 400 determines that Joe skipped forward and is now at minute 15 of the Action Archaeologist movie, which corresponds with the end of the uninteresting scene.

If the dynamic interest-based content buffering process 400 determined that the user skipped the uninteresting portion at 408, then the main cache and child cache are merged at 410. In embodiments, if the user skipped the uninteresting portion, then the relevant data blocks containing the streaming content that the user is consuming may be in the child buffer. Therefore, the data cached in the child buffer may be merged with the main cache such that the main cache will then have access to the data blocks in the child buffer and the streaming content player may transparently continue receiving the requested data blocks from the main buffer without interruption or switching to a different (i.e., child) cache to retrieve the needed data. Thus, the process may be transparent to the streaming content player.

Continuing the prior example, after Joe skips forward to minute 15, the data blocks needed to play that video is in the child buffer which is then merged into the main buffer and the video player playing the Action Archaeologist movie will be able to jump to minute 15 and continue playing video without lag since the data blocks for the video at that point in the movie were already cached locally, thus maintaining a consistent quality of service for Joe despite skipping forward three minutes in the movie.

However, if the dynamic interest-based content buffering process 400 determined that the user did not skip the uninteresting portion at 408, then the child cache is stopped at 412. According to at least one embodiment, if the user continues to play the uninteresting portion of the content without skipping forward, then the dynamic interest-based content buffering process 400 may not need to continue to cache the data blocks occurring after the uninteresting portion via the child thread since a skip forward is no longer expected. Therefore, the child thread may stop filling the child cache. In embodiments, the data blocks in the child cache may be merged into the main cache when the blocks in the child cache would be the next blocks to add to the main cache. Thus, instead of retrieving the data blocks in over the network (e.g., communication network 116) for the main cache, instead, the blocks from the child cache may be merged into the main cache. Moreover, as the child cache is merged into the main cache, the child cache size shrinks or is reduced to zero size and the main cache returns to full size. In embodiments the dynamic interest-based content buffering process 400 may determine that the user will not skip the uninteresting portion once the user has progressed a predetermined threshold (e.g., once the user has progressed 10% into the uninteresting portion, it may be assumed that the user will not skip forward past the portion).

For example, if Joe did not skip forward and instead watched portion 5, then the data block corresponding with portion 6 in the child cache would be merged into the main cache as the content in minute 15 of the Action Archaeologist movie is requested for retrieval and storage in the main cache. As such, the main cache would immediately grow from 35 megabytes to a full 50 megabytes after the 15 megabytes of the child cached data blocks are merged into the main cache.

According to some embodiments, portions of the streaming content that were identified as interesting to the user, as described above at 310, may be retained in cache memory (e.g., the main cache) until a predefined condition is met in order to keep streaming data available for quick retrieval in the event the user rewinds or skips backward to review the interesting portion again. To keep a high quality and lag-free experience for users, interesting portions of data may be retained in quickly retrievable cache memory (e.g., locally or in network cache) instead of immediately expiring the data blocks in the cache after the blocks have been served since a user may want to replay the interesting portion again and a user may be more likely to replay portions that are interesting to them. Different criteria may be used to determine how much of the interesting portions should remain cached and for how long after the user consumed (e.g., watched or listened to) the streaming media (i.e., streaming content) data blocks. In some implementations, the interesting portion may be saved in cache until the next interesting portion begins, after a predefined amount of time passes (e.g., 2 minutes after the end of the cached interesting portion), or a combination of criteria depending on implementation.

For example, if Joe has finished watching portion 6 the Action Archaeologist movie and is now 10 seconds into portion 7, Joe is at minute 19 (the beginning of portion 7) and 10 seconds into the Action Archaeologist movie. Since portion 6 was identified as an interesting portion, portion 6 is retained in cache for another 30 seconds of runtime (per the criteria implemented) after the end of the portion, or until 19 minutes and 30 seconds of the Action Archaeologist movie have elapsed. Therefore, if Joe skips backward at the current time (i.e., 19 minutes and 10 seconds) into the movie back to the start of portion 6, portion 6 is still cached and will be served immediately since the data blocks corresponding with portion 6 have not yet expired and been removed from cache. The result is that Joe will have lag-free playback of portion 6.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

As described in embodiments above, the smart content of interest buffering program 110a and 110b may improve the functionality of a computer by providing a smart caching scheme whereby a streaming content consumer's interests and uninterests are determined and streaming content is cached based on the interests and uninterests of the consumer. Consequently a high quality user experience is maintained while streaming content (e.g., lag-free) since more relevant portions of streaming content are available in high-speed cache memory. The embodiments described herein may result in higher quality user experience while minimizing the amount of additional computer resources and network resources are used to deliver this experience since only targeted portions of the content are retrieved and cached at specific timings instead of blindly caching large amounts of streaming data to ensure an equivalent user experience.

Figure 5:
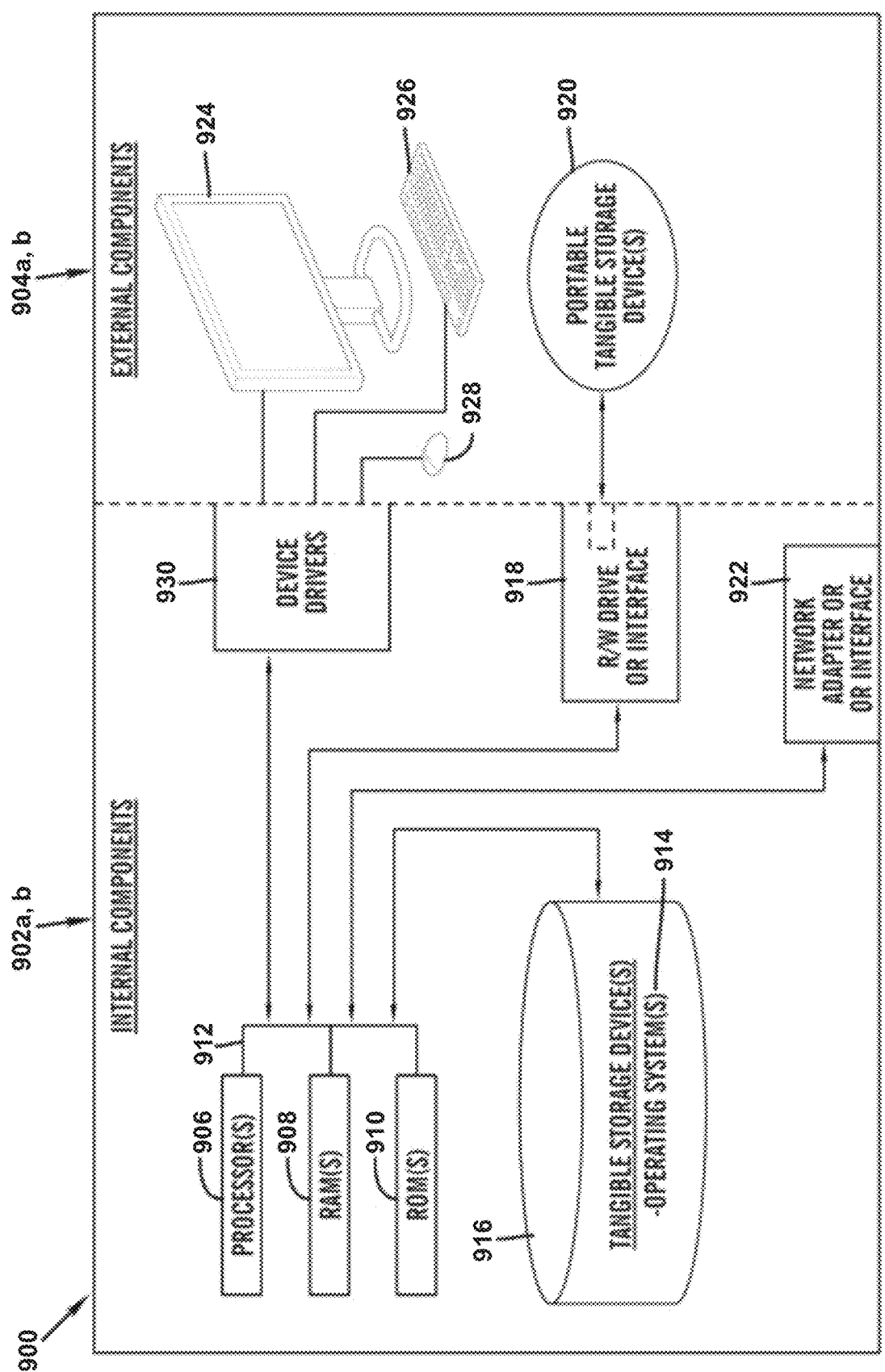
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the smart content of interest buffering program 110a in client computer 102, and the smart content of interest buffering program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk smart content of interest buffering semiconductor storage device. A software program, such as the software program 108 and the smart content of interest buffering program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the smart content of interest buffering program 110a in client computer 102 and the smart content of interest buffering program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the smart content of interest buffering program 110a in client computer 102 and the smart content of interest buffering program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
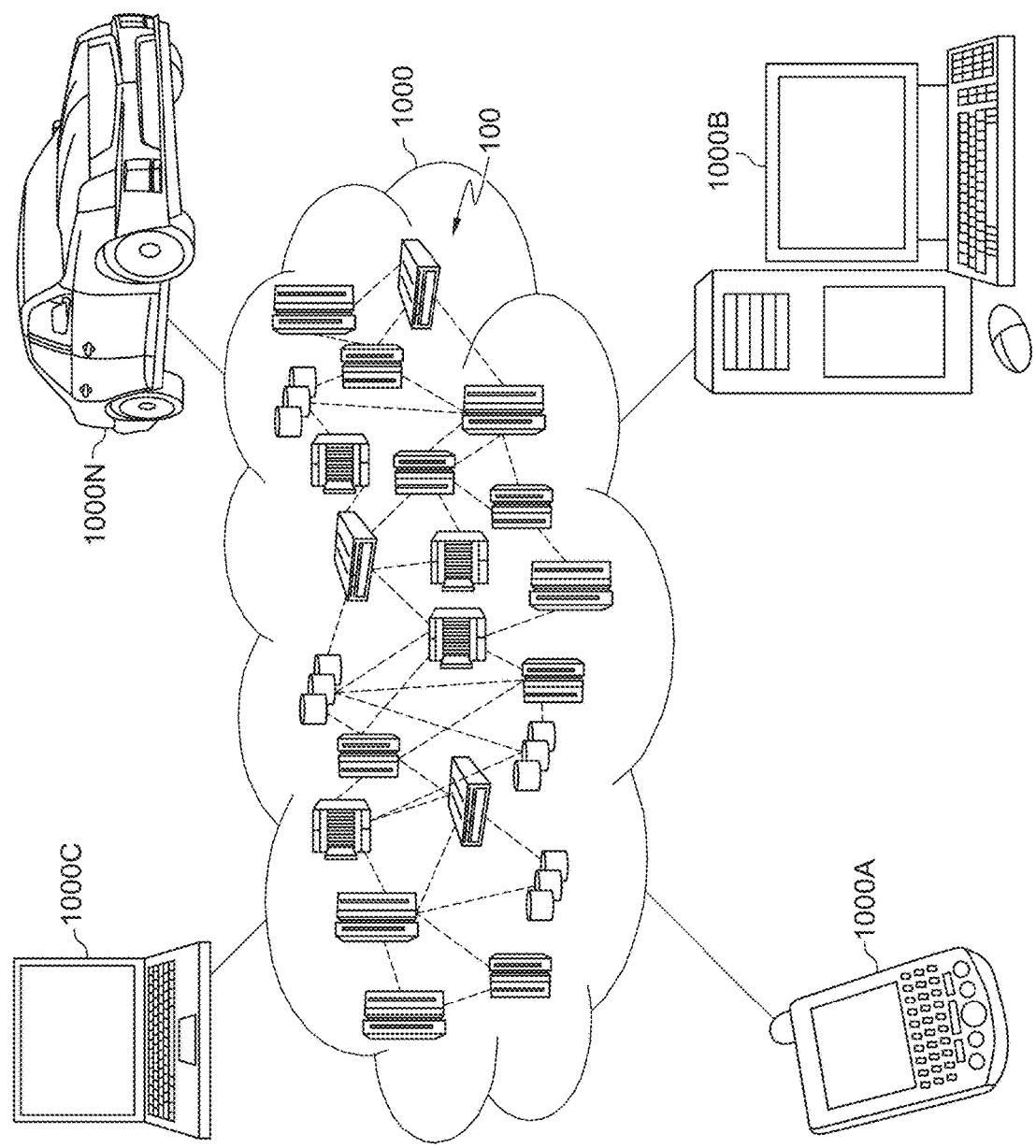
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
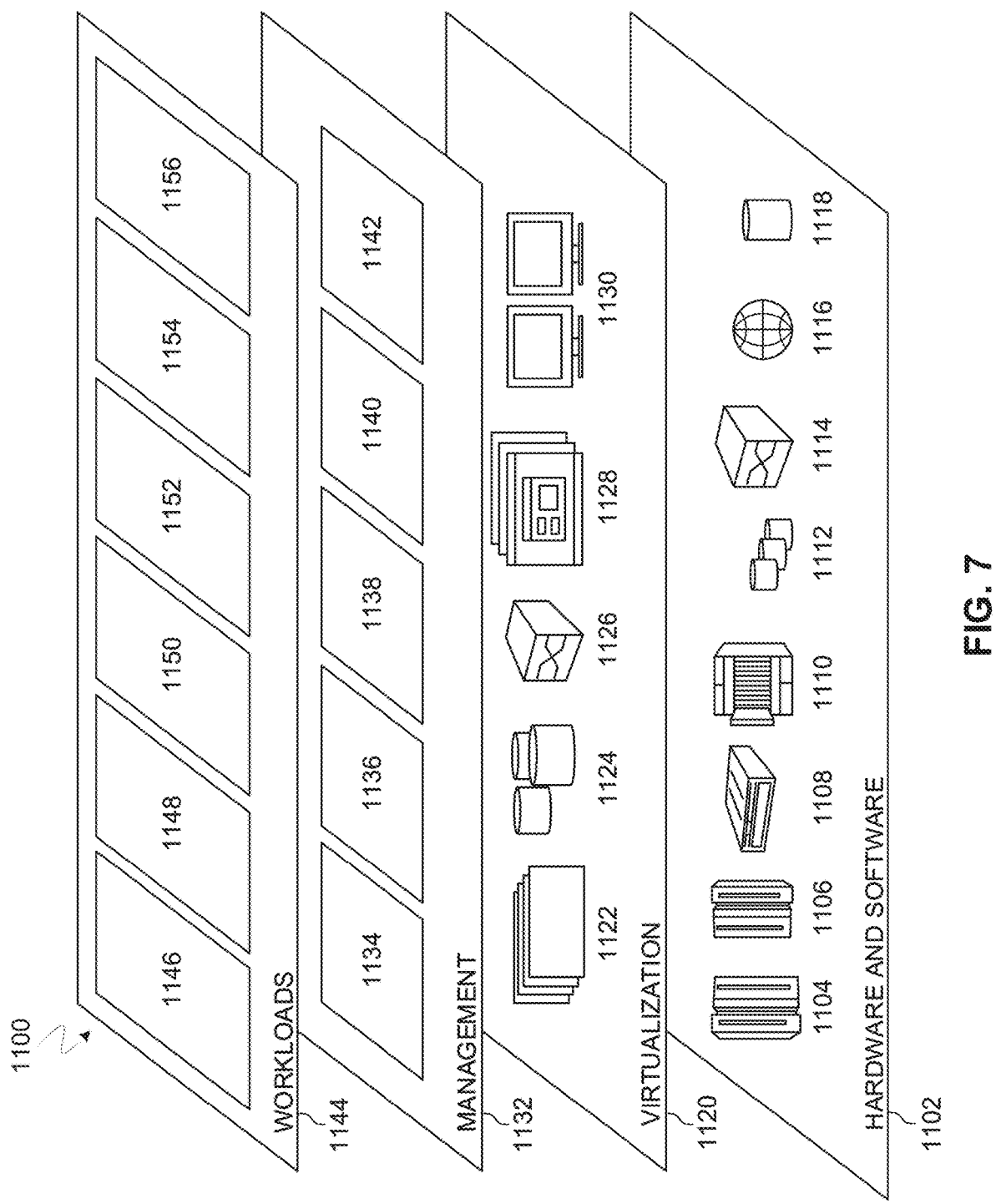
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and smart content of interest buffering 1156. A smart content of interest buffering program 110a, 110b provides a way to intelligently cache streaming content based on interest and uninterest to the content consumer.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for interest-based digital content caching, the method comprising:
    determining hints of content uninterest associated with a user;
    identifying a portion of uninterest within a streaming media based on the determined hints of content uninterest;
    playing the streaming media for the user; and
    storing a portion of post-uninteresting content from the streaming media in a child cache before the portion of uninterest is played, wherein storing the portion of post-uninteresting content from the streaming media in the child cache before the portion of uninterest is played comprises dynamically reducing a main cache size of a main cache concurrently with increasing a child cache size of the child cache.

2. The computer-implemented method of claim 1, further comprising:
    responsive to determining that the user skipped the portion of uninterest, merging the child cache with a main cache.

3. The computer-implemented method of claim 1, wherein determining the hints of content uninterest associated with the user comprises retrieving profile data associated with the user and analyzing the retrieved profile data to determine a plurality of interests and a plurality of uninterests of the user.

4. The computer-implemented method of claim 1, wherein identifying the portion of uninterest within the streaming media based on the determined hints of content uninterest comprises dividing the streaming media into a plurality of distinct portions and then classifying each distinct portion within the plurality of distinct portions.

5. The computer-implemented method of claim 1, wherein storing the portion of post-uninteresting content from the streaming media in the child cache before the portion of uninterest is played comprises determining a plurality of computer resource capabilities and calculating a child thread start time before the portion of uninterest is played based on the determined plurality of computer resource capabilities, wherein the a child thread begins at the child thread start time and wherein the child thread fills the child cache.

6. The computer-implemented method of claim 5, further comprising:
    responsive to determining that the user did not skip the portion of uninterest, stopping the child thread.

7. A computer system for interest-based digital content caching, comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
        determining hints of content uninterest associated with a user;

identifying a portion of uninterest within a streaming media based on the determined hints of content uninterest;

playing the streaming media for the user; and storing a portion of post-uninteresting content from the streaming media in a child cache before the portion of uninterest is played, wherein storing the portion of post-uninteresting content from the streaming media in the child cache before the portion of uninterest is played comprises dynamically reducing a main cache size of a main cache concurrently with increasing a child cache size of the child cache.

8. The computer system of claim 7, further comprising:
responsive to determining that the user skipped the portion of uninterest, merging the child cache with a main cache.

9. The computer system of claim 7, wherein determining the hints of content uninterest associated with the user comprises retrieving profile data associated with the user and analyzing the retrieved profile data to determine a plurality of interests and a plurality of uninterests of the user.

10. The computer system of claim 7, wherein identifying the portion of uninterest within the streaming media based on the determined hints of content uninterest comprises dividing the streaming media into a plurality of distinct portions and then classifying each distinct portion within the plurality of distinct portions.

11. The computer system of claim 7, wherein storing the portion of post-uninteresting content from the streaming media in the child cache before the portion of uninterest is played comprises determining a plurality of computer resource capabilities and calculating a child thread start time before the portion of uninterest is played based on the determined plurality of computer resource capabilities, wherein the a child thread begins at the child thread start time and wherein the child thread fills the child cache.

12. The computer system of claim 11, further comprising:
responsive to determining that the user did not skip the portion of uninterest, stopping the child thread.

13. A computer program product for interest-based digital content caching, comprising a computer-readable storage medium having program instructions embodied therewith, the program instructions executable by a processor to cause the processor to perform a method comprising:

determining hints of content uninterest associated with a user;

identifying a portion of uninterest within a streaming media based on the determined hints of content uninterest;

playing the streaming media for the user; and storing a portion of post-uninteresting content from the streaming media in a child cache before the portion of uninterest is played, wherein storing the portion of post-uninteresting content from the streaming media in the child cache before the portion of uninterest is played comprises dynamically reducing a main cache size of a main cache concurrently with increasing a child cache size of the child cache.

14. The computer program product of claim 13, further comprising:
responsive to determining that the user skipped the portion of uninterest, merging the child cache with a main cache.

15. The computer program product of claim 13, wherein determining the hints of content uninterest associated with the user comprises retrieving profile data associated with the user and analyzing the retrieved profile data to determine a plurality of interests and a plurality of uninterests of the user.

16. The computer program product of claim 13, wherein identifying the portion of uninterest within the streaming media based on the determined hints of content uninterest comprises dividing the streaming media into a plurality of distinct portions and then classifying each distinct portion within the plurality of distinct portions.

17. The computer program product of claim 13, wherein storing the portion of post-uninteresting content from the streaming media in the child cache before the portion of uninterest is played comprises determining a plurality of computer resource capabilities and calculating a child thread start time before the portion of uninterest is played based on the determined plurality of computer resource capabilities, wherein the a child thread begins at the child thread start time and wherein the child thread fills the child cache.

\* \* \* \* \*